(12) United States Patent
Zhang et al.

(10) Patent No.: US 12,124,853 B2
(45) Date of Patent: Oct. 22, 2024

(54) DATA LOADING AND STORAGE SYSTEM AND METHOD

(71) Applicant: Beijing Tsingmicro Intelligent Technology Co., Ltd., Beijing (CN)

(72) Inventors: Pengpeng Zhang, Beijing (CN); Peng Ouyang, Beijing (CN)

(73) Assignee: BEIJING TSINGMICRO INTELLIGENT TECHNOLOGY CO., LTD., Beijing (CN)

(*) Notice: Subject to any disclaimer, the term of this patent is extended or adjusted under 35 U.S.C. 154(b) by 449 days.

(21) Appl. No.: 17/484,850

(22) Filed: Sep. 24, 2021

(65) Prior Publication Data

US 2022/0100521 A1    Mar. 31, 2022

Related U.S. Application Data

(63) Continuation of application No. PCT/CN2021/079111, filed on Mar. 4, 2021.

(30) Foreign Application Priority Data

Sep. 29, 2020  (CN) .......................... 202011053379.4

(51) Int. Cl.
*G06F 9/38*      (2018.01)
*G06F 7/72*      (2006.01)
(Continued)

(52) U.S. Cl.
CPC ............ *G06F 9/3814* (2013.01); *G06F 7/727* (2013.01); *G06F 9/30043* (2013.01);
(Continued)

(58) Field of Classification Search
None
See application file for complete search history.

(56) References Cited

U.S. PATENT DOCUMENTS 6,526,430 B1 *  2/2003  Hung ................... H04N 19/433
                                                    375/E7.101
8,095,173 B2 *  1/2012  Chapyzhenka ..... G06F 15/7867
                                                    455/418
(Continued)

FOREIGN PATENT DOCUMENTS

CN       101625671       1/2010
CN       102375801       3/2012

OTHER PUBLICATIONS

Sun, Machine Translation of Chinese Patent Application CN 102375801 A, 2012. (Year: 2012).*

(Continued)

*Primary Examiner* — Steven G Snyder
(74) *Attorney, Agent, or Firm* — Hodgson Russ LLP (57) ABSTRACT

A data loading and storage system includes a storage module, a buffering module, a control module, a plurality of data loading modules, a plurality of data storage modules and a multi-core processor array module. The data is continuously stored in a DDR, and the data computed by the multi-core processor may be arranged continuously or be arranged according to a certain rule. After DMA reads the data into the DATA_BUF module by a BURST mode, in order to support fast loading of the data into the multi-core processor array, the data loading modules (i.e., load modules) are designed. In order to quickly store the computed result of the multi-core processor array into the (DATA_BUF module according to a certain rule, the data storage modules (i.e., store module) are designed.

20 Claims, 3 Drawing Sheets

(51) Int. Cl.
*G06F 9/30* (2018.01)
*G06F 13/16* (2006.01)
*G06F 17/14* (2006.01)

(52) U.S. Cl.
CPC ...... *G06F 9/30145* (2013.01); *G06F 13/1673* (2013.01); *G06F 17/142* (2013.01)

(56) References Cited

U.S. PATENT DOCUMENTS

| | | | | |
|---|---|---|---|---|
| 10,579,390 | B2* | 3/2020 | Etsion | G06F 9/4494 |
| 11,003,458 | B2* | 5/2021 | Etsion | G06F 9/448 |
| 2013/0054939 | A1* | 2/2013 | Felch | G06F 9/30181 712/42 |
| 2015/0268963 | A1* | 9/2015 | Etsion | G06F 9/3869 712/225 |
| 2018/0101387 | A1* | 4/2018 | Etsion | G06F 9/3851 |
| 2020/0159539 | A1* | 5/2020 | Etsion | G06F 9/4881 |

OTHER PUBLICATIONS

Juanjo Noguera et al., 'System-Level Power-Performance Tradeoffs for Reconfigurable Computing', IEEE Transactions on Very Large Scale Integration (VLSI) Systems, vol. 14, No. 7, Jul. 2006. (Year: 2006).*
Jacob et al., 'Memory Interfacing and Instruction Specification for Reconfigurable Processors,' copyright ACM, 1999. (Year: 1999).*
Machine Translation of Chinese Patent Application CN 101625671 A, 2010. (Year: 2010).*
Machine Translation of Chinese Patent Application CN 202217274 U, 2012. (Year: 2012).*
Machine Translation of Chinese Patent Application CN 114265717 A, 2022. (Year: 2022).*
Machine Translation of WIPO Publication WO 2015024432 A1, 2015. (Year: 2015).*
Machine Translation of Japanese Patent Application JP 3027970 B2, 2000. (Year: 2000).*

* cited by examiner

DATA LOADING AND STORAGE SYSTEM AND METHOD

CROSS-REFERENCE TO RELATED APPLICATIONS

This application is a continuation of International Application No. PCT/CN2021/079111, filed Mar. 4, 2021, which is based on and claims priority to and benefits of Chinese Patent Application No. 202011053379.4, filed on Sep. 29, 2020, the entire contents of which are incorporated herein by reference.

FIELD

The present disclosure relates to a field of multi-core processor array data loading and storage technology, and more particularly to a data loading and storage system and method.

BACKGROUND

A coarse-grained reconfigurable architecture has higher performance than a general-purpose processor and better flexibility than a special integrated circuit. The coarse-grained reconfigurable architecture is internally interconnected to form a multi-core processor array, which may process logic or arithmetic operations in parallel. However, the existing coarse-grained reconfigurable architecture cannot meet various computing requirements, and cannot support data loading and storage of multi-core processor arrays.

SUMMARY

An object of the present disclosure is to provide a data loading and storage system and method, which are capable of solving problems that the existing coarse-grained reconfigurable architecture cannot meet various computing requirements, and cannot support data loading and storage of multi-core processor arrays.

In order to achieve the above-mentioned object, the present disclosure provides the technical solutions as follows.

In a first aspect of the present disclosure, a data loading and storage system is provided. The data loading and storage system includes:
  a storage module, configured to store configuration instructions and data;
  a buffering module, including an instruction buffering module and a data buffering module, wherein the instruction buffering module is configured to buffer the configuration instructions in the storage module, and the data buffering module is configured to buffer the data in the storage module;
  a control module, configured to send a trigger signal;
  a plurality of data loading modules, configured to read the configuration instructions in the instruction buffering module in response to receiving the trigger signal, generate a data address according to the configuration instructions, and read the data in the data buffering module according to the data address;
  a multi-core processor array module, configured to receive the data read by the plurality of data loading modules, and compute the received data to obtain computed data; and
  a plurality of data storage modules, configured to receive and store the computed data from the multi-core processor array module, and
  the data buffering module is further configured to receive and buffer the computed data from the multi-core processor array module, and write the computed data back to the storage module.

In an embodiment of the present disclosure, the plurality of the data loading modules and the plurality of the data storage modules are respectively provided with a plurality of corresponding fetching modules configured to generate addresses for reading the configuration instructions.

In an embodiment of the present disclosure, the plurality of the data loading modules and the plurality of the data storage modules are respectively provided with a plurality of corresponding decoding modules configured to receive the configuration instructions output by the fetching modules. The plurality of the decoding modules are further configured to analyze and store parameters of the configuration instructions.

In an embodiment of the present disclosure, the plurality of the data loading modules and the plurality of the data storage modules are respectively provided with a plurality of corresponding address generating modules configured to receive the parameters of the configuration instructions output by the decoding modules.

In an embodiment of the present disclosure, the plurality of the address generating modules are configured to perform indirect addressing or direct addressing according to the configuration instructions.

In an embodiment of the present disclosure, the data loading and storage system further includes a plurality of registers. A register used for a base address is selected from the plurality of the registers according to a parameter of a corresponding field of the configuration instructions, in response to the indirect addressing of the plurality of the address generating modules.

In an embodiment of the present disclosure, the address generating module is configured to support address conversion, address modulo and normal mode.

The number of the plurality of the data loading modules and the number of the plurality of the data storage modules are determined according to a specification of the multi-core processor array module.

In an embodiment of the present disclosure, the plurality of the data loading modules and the plurality of the data storage modules are each provided with a fast fourier transform algorithm (FFT) dedicated address generator. The plurality of the data loading modules are configured to load the data and a twiddle factor from the plurality of the data buffering modules, and the FFT dedicated address generator is configured to generate addresses according to the number of points and a current level of FFT, in response to calling the FFT dedicated address generator.

In an embodiment of the present disclosure, the plurality of the data storage modules are configured to store the computed data from the multi-core processor array module into the plurality of the data buffering modules for next-level FFT computing.

In a second aspect of the present disclosure, a data loading and storage method is provided. The data loading and storage method includes:
  storing configuration instructions and data;
  buffering the configuration instructions and the data;
  reading the configuration instructions in response to receiving a trigger signal, generating a data address according to the configuration instructions, and reading the data according to the data address;

receiving the read data, and computing the received data to obtain computed data;

receiving and storing the computed data;

receiving and buffering the computed data, and storing the computed data again.

In an embodiment of the present disclosure, the data loading and storage method further includes reading addresses of the configuration instructions.

In an embodiment of the present disclosure, the data loading and storage method further includes receiving the configuration instructions, and analyzing and storing parameters of the configuration instructions.

In an embodiment of the present disclosure, the data loading and storage method further includes performing indirect addressing or direct addressing according to the configuration instructions.

In an embodiment of the present disclosure, the data loading and storage method further includes selecting a register for a base address according to a parameter of a corresponding field of the configuration instructions in response to the indirect addressing.

In an embodiment of the present disclosure, the data loading and storage method further includes supporting address conversion, address modulo and normal mode.

In an embodiment of the present disclosure, the data loading and storage method further includes generating an FFT dedicated address.

In an embodiment of the present disclosure, the data loading and storage method further includes loading the data and a twiddle factor and generating the FFT dedicated address according to the number of points and a current level of FFT.

In an embodiment of the present disclosure, the data loading and storage method further includes storing the computed data for next-level FFT computing.

The data loading and storage system and method provided in above embodiments of the present disclosure have the following advantages.

According to the data loading and storage system and method provided in embodiments of the present disclosure, the data is continuously stored in a double data rate synchronous dynamic random access memory (DDR), and the data computed by the multi-core processor may be arranged continuously or be arranged according to a certain rule. After direct memory access (DMA) reads the data into the data buffering module by a BURST mode, in order to support fast loading of the data into the multi-core processor array, the data loading modules (i.e., load modules) are designed. In order to quickly store the computed result of the multi-core processor array into the data buffering module (DATA_BUF) according to a certain rule, the data storage modules (i.e., store module) are designed. The data to be computed is sent to the multi-core processor array module through the data loading modules and the data storage modules, and the computed result of the multi-core processor array module is placed in the storage module.

BRIEF DESCRIPTION OF THE DRAWINGS

In order to illustrate the present disclosure more clearly, some embodiments of the present disclosure will be further described in the following with reference to the drawings. It will be appreciated that the drawings described below are only related to some embodiments of the present invention, based on which some other drawings and related embodiments can also be obtained by a person skilled in the art without creative work.

REFERENCE NUMERALS buffering module 10; instruction buffering module 101; data buffering module 102; data loading module 20; data storage module 30; multi-core processor array module 40; fetching module 50; decoding module 60; address generating module 70.

DETAILED DESCRIPTION

In order to make the objects, technical solutions and advantages of the present disclosure more clear, embodiments of the present disclosure will be described clearly and completely below in combination with accompanying drawings. It will be understood to those skilled in the art that the embodiments described hereinafter are only a part of embodiments of the present disclosure, rather than all embodiments of the present disclosure, and any other embodiments obtainable by those ordinarily skilled in the art on the basis of embodiments described herein without creative works fall within the protection scope of the present disclosure.

The present disclosure provides in embodiments a data loading and storage system and method.

The data loading and storage system includes a storage module, a buffering module, a control module, a plurality of data loading modules, a multi-core processor array module and a plurality of data storage modules.

The storage module is configured to store configuration instructions and data.

The buffering module includes an instruction buffering module and a data buffering module. The instruction buffering module is configured to buffer the configuration instructions in the storage module, and the data buffering module is configured to buffer the data in the storage module.

The control module is configured to send a trigger signal.

The plurality of data loading modules are configured to read the configuration instructions in the instruction buffering module in response to receiving the trigger signal, generate a data address according to the configuration instructions, and read the data in the data buffering module according to the data address.

The multi-core processor array module is configured to receive the data read by the plurality of the data loading modules, and compute the received data to obtain computed data.

The plurality of data storage modules are configured to receive and store the computed data from the multi-core processor array module.

The data buffering module is further configured to receive and buffer the computed data from the multi-core processor array module, and write the computed data back to the storage module.

In an embodiment of the present disclosure, the plurality of the data loading modules and the plurality of the data storage modules are respectively provided with a plurality of corresponding fetching modules. The plurality of the fetching modules are configured to generate addresses for reading the configuration instructions.

In an embodiment of the present disclosure, the plurality of the data loading modules and the plurality of the data storage modules are respectively provided with a plurality of corresponding decoding modules. The plurality of the decoding modules are configured to receive the configuration instructions output by the fetching modules. The plurality of the decoding modules are further configured to analyze and store parameters of the configuration instructions.

In an embodiment of the present disclosure, the plurality of the data loading modules and the plurality of the data storage modules are respectively provided with a plurality of corresponding address generating modules. The plurality of the address generating modules are configured to receive the parameters of the configuration instructions output by the decoding modules.

In an embodiment of the present disclosure, the plurality of the address generating modules are configured to perform indirect addressing or direct addressing according to the configuration instructions.

In an embodiment of the present disclosure, the data loading and storage system further includes a plurality of registers. A register used for a base address is selected from the plurality of the registers according to a parameter of a corresponding field of the configuration instructions, in response to the indirect addressing of the plurality of the address generating modules.

In an embodiment of the present disclosure, the address generating module is configured to support address conversion, address modulo and normal mode.

In an embodiment of the present disclosure, the number of the plurality of the data loading modules and the number of the plurality of the data storage modules are determined according to a specification of the multi-core processor array module.

In an embodiment of the present disclosure, the plurality of the data loading modules and the plurality of the data storage modules are each provided with an FFT dedicated address generator. The plurality of the data loading modules are configured to load the data and a twiddle factor from the plurality of the data buffering modules, and the FFT dedicated address generator is configured to generate addresses according to the number of points and a current level of FFT, in response to calling the FFT dedicated address generator.

In an embodiment of the present disclosure, the plurality of the data storage modules are configured to store the computed data from the multi-core processor array module into the plurality of the data buffering modules for next-level FFT computing.

Figure 1:
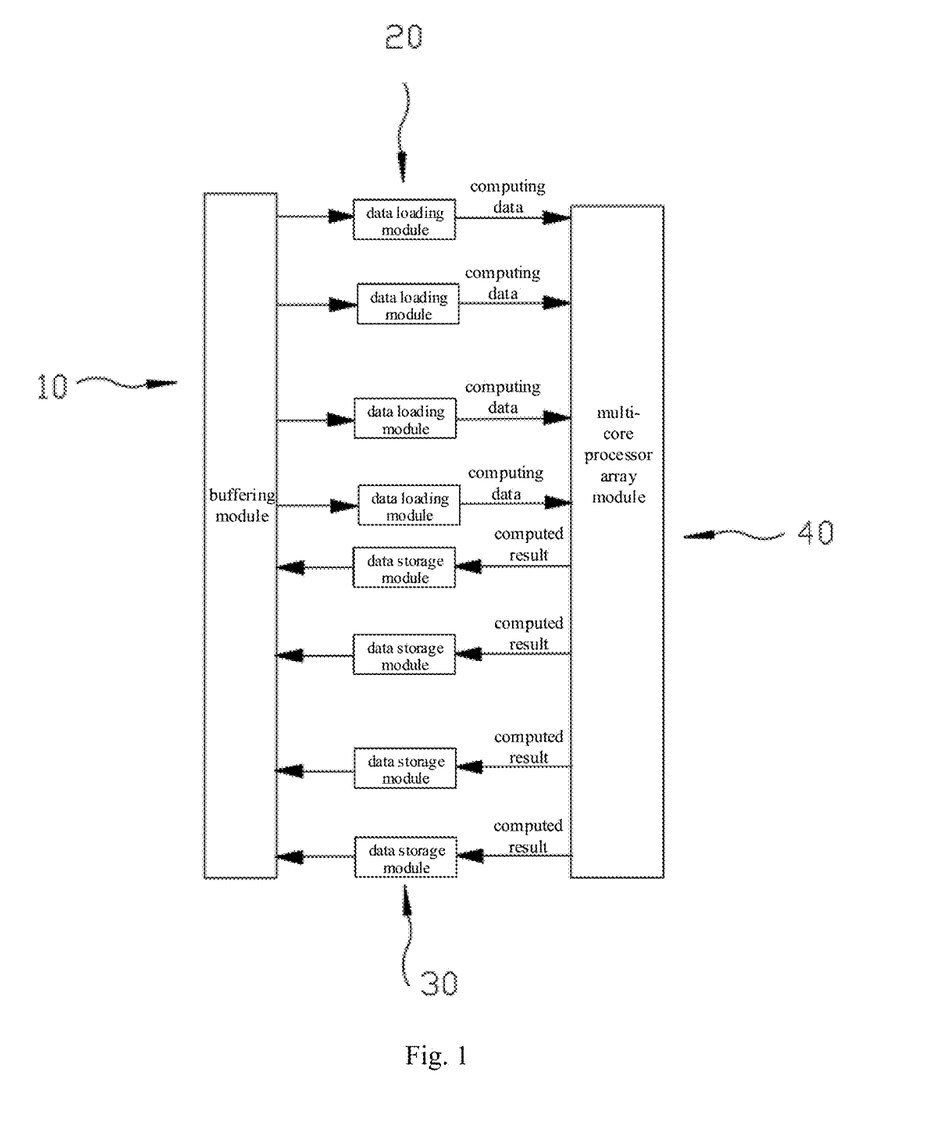
FIG. 1 is a schematic block diagram illustrating an overall architecture of a data loading and storage system according to an embodiment of the present disclosure.
Figure 2:
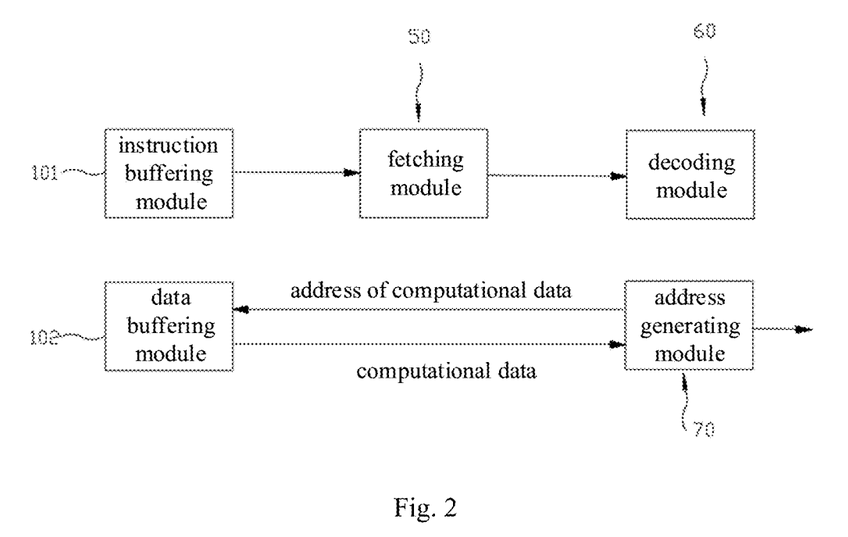
FIG. 2 is schematic block diagram illustrating a data loading module of a data loading and storage system according to an embodiment of the present disclosure.
Figure 3:
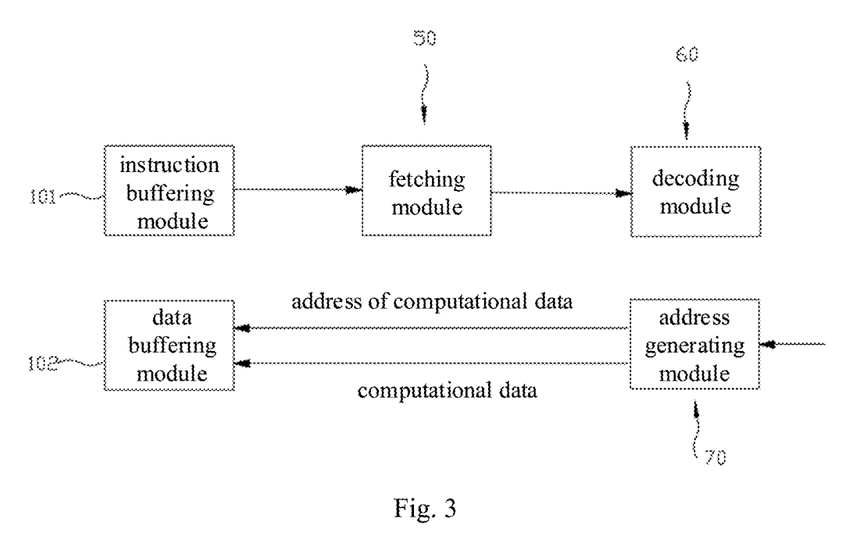
FIG. 3 is schematic block diagram illustrating a data storage module of a data loading and storage system according to an embodiment of the present disclosure.

As shown in FIG. 1 to FIG. 3, the present disclosure provides in embodiments a data loading and storage system and method for a multi-core processor array. The data loading and storage system includes a storage module, a buffering module 10, a control module, a plurality of data loading modules 20 (i.e., load modules), a plurality of data storage modules 30 (i.e., store modules) and a multi-core processor array module 40. The buffering module 10 includes an instruction buffering module (i.e., CSPM_BUF module) 101 and a data buffering module (i.e., DATA_BUF module) 102.

The data is stored continuously in a double data rate synchronous dynamic random access memory (DDR), and the data computed by a multi-core processor may be arranged continuously or be arranged according to a certain rule. After direct memory access (DMA) reads the data into the DATA_BUF module by a BURST mode, in order to support fast loading of the data into the multi-core processor array, the data loading modules 20 (i.e., load modules) are designed. Further, in order to quickly store the computed result of the multi-core processor array into the data buffering module (i.e., DATA_BUF module) according to a certain rule, the data storage modules 30 (i.e., store modules) are designed.

An advanced synchronization circuit is adopted by DDR, such that main steps of address specifying, data transmission and data output may not only be performed independently, but also may be completely synchronized with a central processing unit (CPU). The DDR uses a delay locked loop (DLL) to provide a data filtering signal. When the data is valid, a storage controller may use the data filtering signal to accurately locate the data, with data output once per 16 times operations, and resynchronize the data from different memory modules.

Essentially, the DDR may double the speed of the synchronous dynamic random-access memory (SDRAM) without increasing a clock frequency, and allow data reading at rising and falling edges of a clock pulse. The DDR has 184 pins, which mainly includes new control, clock, power, and ground signals. The DDR memory adopts a SSTL2 standard that supports 2.5V voltage.

DMA is an important feature of all modern computers, which allows hardware devices with different speeds to communicate, without relying on massive interrupt loading of CPU. DMA transmission copies data from one address space to another address space. When this transmission action is initiated by CPU, the transmission action per se is performed and completed by a DMA controller. A typical example is moving a block of an external memory to a faster memory area inside the chip, such an action does not delay the work of the processor, but the processor may be rescheduled to handle other works. DMA transmission is very important for high-performance embedded system algorithms and networks.

In the implementation of the DMA transmission, the DMA controller directly controls a bus, so a bus controlling right needs to be transferred during this process. This is, before the DMA transmission, CPU transfers the bus controlling right to the DMA controller, and after the DMA transmission, the DMA controller should immediately return the bus controlling right back to CPU. A complete DMA transmission includes DMA request, DMA response, DMA transmission, and DMA end.

The storage module is configured to store configuration instructions and data.

The buffering module 10 includes the instruction buffering module 101 and the data buffering module 102. The instruction buffering module 101 is configured to buffer the configuration instructions in the storage module, and the data buffering module 102 is configured to buffer the data in the storage module.

The instruction buffering module 101 (i.e., the CSPM_BUF module) is configured to store instructions to be performed, and the data buffering module 102 (i.e., the DATA_BUF module) is configured to store data to be computed. The CSPM_BUF module is configured to support a ping-pong mode and a continuous mode. This is, the CSPM_BUF module is composed of two buffers, and the data loading module is configured to achieve ping-pong and continuous reading of the CSPM_BUF module according to upper-layer control signals.

The configuration instruction includes a base address of data to be loaded, a base address of data to be stored, a size of the data to be loaded, a size of the data to be stored, an arrangement of the data to be loaded, and an arrangement of the data to be stored of the data loading module and the data storage module. The CSPM_BUF module for buffering the configuration instructions supports a ping-pong operation and a continuous operation to improve the access efficiency to the configuration instructions.

The control module is configured to send a trigger signal.

The data loading modules 20 are configured to read the configuration instructions in the corresponding instruction buffering module 101 in response to receiving the trigger signal, generate a data address according to the configuration instructions, and read the data in the data buffering module 102 according to the data address.

The multi-core processor array module 40 is configured to receive the data read by the plurality of the data loading modules 20, and compute the received data to obtain computed data.

The data storage modules 30 are configured to receive and store the computed data from the multi-core processor array module 40.

The data buffering module 102 is further configured to receive and buffer the computed data from the multi-core processor array module, and write the computed data back to the storage module.

In an embodiment of the present disclosure, after receiving the trigger signal of the control module, the data loading module 20 independently reads the configuration instructions in the corresponding instruction buffering module 101. The plurality of the data loading modules 20 are provided with a plurality of corresponding fetching modules 50. The plurality of the fetching modules 50 are configured to generate addresses for reading the configuration instructions, and send the configuration instructions to decoding modules 60.

In an embodiment of the present disclosure, the plurality of the data loading modules 20 are provided with a plurality of corresponding decoding modules 60. The plurality of the decoding module 60 are configured to receive the configuration instructions output by the fetching module 50, analyze and store parameters of the configuration instructions for the generation of the data address.

In an embodiment of the present disclosure, the data loading module is configured to support indirect addressing or direct addressing.

In the indirect addressing, a register used for the base address is selected from a plurality of registers according to a parameter of a corresponding field of the configuration instructions, and the plurality of the registers may be configured by the control module. In the direct addressing, the base address is from the configuration instructions.

The load/store instruction includes an address mode field, which indicates whether the instruction is directed to the indirect addressing or the direct addressing. In the indirect addressing mode, the register field indicates the register used for the base address.

The plurality of the data loading modules 20 are provided with a plurality of corresponding address generating modules 70. The plurality of the address generating modules 70 are configured to receive the parameters of the configuration instructions output by the decoding modules 60.

In an embodiment of the present disclosure, the plurality of the address generating modules 70 are configured to perform the indirect addressing or the direct addressing according to the configuration instructions.

In an embodiment of the present disclosure, the data loading and storage system further includes the plurality of the registers. In response to the indirect addressing of the plurality of the address generating modules, the register used for the base address is selected from the plurality of the registers according to the parameter of the corresponding field of the configuration instructions.

The address generating module 70 not only supports the base address indirect addressing and direct addressing, but also supports address conversion, address modulo and normal mode. The number of the data loading modules and the number of the data storage modules may be determined according to the specification of the multi-core processor array module.

The load/store instruction includes an address mode field, which supports 7 modes in total, including: the address conversion, address modulo and normal mode in the indirect addressing, the address conversion, address modulo and normal mode in the direct addressing, and address generation with a fast fourier transform algorithm (FFT). The address mode field adopts a 3 bits field to code the above modes.

In addition to supporting the above modes, the data loading module is also provided with a built-in FFT dedicated address generator. In response to calling the FFT dedicated address generator, the plurality of the data loading modules 20 are configured to load the data and the twiddle factor from the plurality of the data buffering modules 102, and the FFT dedicated address generator is configured to generate addresses according to the number of points and the current level of FFT. When the read load instruction makes the FFT mode available, the data loading module may load the data and the twiddle factor from different DATA_BUF modules, and the address is generated according to the number of points and the current level of FFT.

The data storage module 30 is configured to read the data in the corresponding data buffering module 102 in response to receiving the trigger signal. After receiving the trigger signal of the control module, the data storage module 30 independently reads the configuration instructions in the corresponding instruction buffering module 101. The plurality of the data storage modules 30 are provided with a plurality of corresponding fetching modules 50. The plurality of the fetching module 50 are configured to generate addresses for reading the configuration instructions, and send the configuration instructions to decoding modules 60.

The plurality of the data storage module 30 are provided with a plurality of corresponding decoding modules 60. The plurality of the decoding modules 60 are configured to receive the configuration instructions output by the fetching modules 50, analyze and store the parameters of the configuration instructions for the generation of the data address.

The data storage module is configured to support indirect addressing or direct addressing. In the indirect addressing, a register used for the base address is selected from the plurality of the registers according to the parameter of the corresponding field of the configuration instructions, and these registers may be configured by the control module. In the direct addressing, the base address is from the configuration instructions.

The plurality of the data storage modules 30 are provided with a plurality of corresponding address generating modules 70. The plurality of the address generating modules 70 are configured to receive the parameters of the configuration instructions output by the decoding modules 60.

In an embodiment of the present disclosure, the plurality of the address generating modules 70 are configured to perform indirect addressing or direct addressing according to the configuration instructions.

The address generating module 70 not only supports the base address indirect addressing and direct addressing, but also supports address conversion, address modulo and normal mode. The number of the data storage modules may be determined according to the specification of the multi-core processor array module.

In addition to supporting the above modes, the data storage module is also provided with a built-in FFT dedicated address generator. When the read store instruction makes the FFT mode available, the data storage module stores the computed result into the DATA_BUF module for next-level FFT computing.

For example, for a 1024 (2^10)-point FFT, a total of 10 levels (that is $1^{st}$ level, $2^{nd}$ level, . . . , $9^{th}$ level, $10^{th}$ level) of FFT computing need to be performed, with one level of the FFT computing performed each time for the data loading module and the data storage module. The FFT address generator generates the corresponding address according to the number of points (1024 points) and the current level of FFT.

The multi-core processor array module 40 is configured to receive the data read by the plurality of the data loading modules 20, and compute the received data to obtain computed data.

The plurality of the data storage modules 30 are configured to receive and store the computed data from the multi-core processor array module 40.

The data buffering module 102 is further configured to receive and buffer the computed data from the multi-core processor array module 40, and write the computed data back to the storage module.

The multi-core processor array module 40 includes a plurality of processor cores, like processor core 1, processor core 2, . . . , processor core N, and each processor core is a single processor unit. The multi-core processor array module 40 is configured to read an instruction code from the instruction buffering module 101 and read the data from the data buffering module 102, and perform the instruction code to compute the data.

The present disclosure provides in embodiments a data loading and storage method. The method includes steps as follows.

In step S11, configuration instructions and data are stored.

In step S12, the configuration instructions and the data are buffered.

In step S13, the configuration instructions are read in response to receiving a trigger signal, a data address is generated according to the configuration instructions, and the data is read according to the data address.

In step S14, the read data is received, and the received data is computed to obtain computed data.

In step S15, the computed data is received and stored.

In step S16, the computed data is received and buffered, and the computed data is stored again.

In an embodiment of the present disclosure, the data loading and storage method further includes reading addresses of the configuration instructions.

In an embodiment of the present disclosure, the data loading and storage method further includes receiving the configuration instructions, and analyzing and storing parameters of the configuration instructions.

In an embodiment of the present disclosure, the data loading and storage method further includes performing indirect addressing or direct addressing according to the configuration instructions.

In an embodiment of the present disclosure, the data loading and storage method further includes selecting a register for a base address according to a parameter of a corresponding field of the configuration instructions in response to the indirect addressing.

In an embodiment of the present disclosure, the data loading and storage method also supports address conversion, address modulo and normal mode.

In an embodiment of the present disclosure, the data loading and storage method further includes generating an FFT dedicated address.

In an embodiment of the present disclosure, the data loading and storage method further includes loading the data and a twiddle factor, and generating the FFT dedicated address according to the number of points and a current level of FFT.

In an embodiment of the present disclosure, the data loading and storage method further includes storing the computed data for next-level FFT computing.

Figure 4:
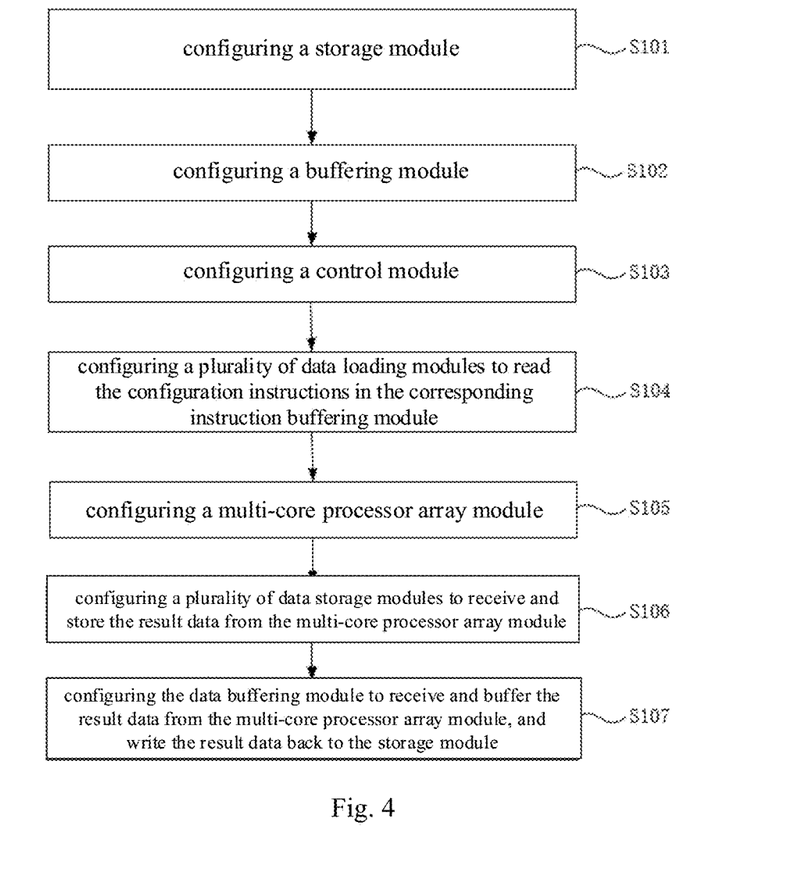
FIG. 4 is a flow chart illustrating a data loading and storage method according to an embodiment of the present disclosure.

In an embodiment of the present disclosure, the data loading and storage method includes the following steps S101 to S107, as shown in FIG. 4.

In step S101, a storage module is configured.

In this step, the storage module is configured to store configuration instructions and data.

In step S102, a buffering module is configured.

In this step, the buffering module 10 is configured, which includes an instruction buffering module 101 and a data buffering module 102. The instruction buffering module 101 is configured to read and buffer the configuration instructions from the storage module, and the data buffering module 102 is configured to read and buffer the data from the storage module.

In step S103, a control module is configured.

In this step, the control module is configured to send a trigger signal.

In step S104, a plurality of data loading modules are configured to read the configuration instructions in the corresponding instruction buffering module.

In this step, the plurality of the data loading modules 20 are configured to determine whether the trigger signal is received, if yes, the data loading modules 20 read the configuration instructions in the instruction buffering module 101.

In step S105, a multi-core processor array module is configured.

In this step, the multi-core processor array module 40 is configured to read the configuration instructions from the data loading modules 20, read data from data storage modules, and execute the configuration instructions to perform data computing to obtain computed data.

In step S106, a plurality of data storage modules are configured to receive and store the computed data from the multi-core processor array module.

In this step, the plurality of data storage modules 30 are configured to receive and store the computed data from the multi-core processor array module 40.

In step S107, the data buffering module is configured to receive and buffer the computed data from the multi-core processor array module, and write the computed data back to the storage module.

In this step, the data buffering module 102 is able to receive and buffer the computed data from the multi-core processor array module 40, and write the computed data back to the storage module.

It should be noted that the illustrations and explanations as described in the system embodiments are also applicable to the method embodiments.

It should be understood that although the present disclosure is described with reference to the above embodiments, not every embodiment only includes an independent technical solution. The description manner of the specification is only for clarity and ease of understanding, those skilled in the art should regard the specification as a whole, and embodiments or the technical features described therein can also be appropriately combined to form other embodiments that can be understood by those skilled in the art.

Finally, it should be noted that the above embodiments are only used to generally understand the present disclosure, and thus shall not be construed to limit the present disclosure. Although the present disclosure is described in detail with reference to the above embodiments, it would be appreciated by those skilled in the art that changes, alternatives, equivalents and modifications can be made in the embodiments without departing from spirit, principles and scope of the present disclosure.

What is claimed is:

1. A data loading and storage system, comprising:
a storage module, configured to store configuration instructions and data;
a buffering module, comprising an instruction buffering module and a data buffering module, wherein the instruction buffering module is configured to buffer the configuration instructions in the storage module, and the data buffering module is configured to buffer the data in the storage module;
a control module, configured to send a trigger signal;
a plurality of data loading modules, configured to read the configuration instructions in the instruction buffering module in response to receiving the trigger signal, generate a data address according to the configuration instructions, and read the data in the data buffering module according to the data address;
a multi-core processor array module, configured to receive the data read by the plurality of data loading modules, and compute the received data to obtain computed data; and
a plurality of data storage modules, configured to receive and store the computed data from the multi-core processor array module;
wherein the data buffering module is further configured to receive and buffer the computed data from the multi-core processor array module, and write the computed data back to the storage module,
the plurality of data loading modules and the plurality of data storage modules are each provided with a fast Fourier transform (FFT) dedicated address generator; and
the plurality of data loading modules are configured to load the data and a twiddle factor from the plurality of data buffering modules, and the FFT dedicated address generator is configured to generate addresses according to a number of points and a current level of FFT in response to calling the FFT dedicated address generator.

2. The data loading and storage system according to claim 1, wherein the plurality of data loading modules and the plurality of data storage modules are respectively provided with a plurality of corresponding fetching modules configured to generate addresses for reading the configuration instructions.

3. The data loading and storage system according to claim 2, wherein the plurality of data loading modules and the plurality of data storage modules are respectively provided with a plurality of corresponding decoding modules configured to receive the configuration instructions output by the fetching modules;
wherein the plurality of decoding modules are further configured to analyze and store parameters of the configuration instructions.

4. The data loading and storage system according to claim 3, wherein the plurality of data loading modules and the plurality of data storage modules are respectively provided with a plurality of corresponding address generating modules configured to receive the parameters of the configuration instructions output by the decoding modules.

5. The data loading and storage system according to claim 4, wherein the plurality of address generating modules are configured to perform indirect addressing or direct addressing according to the configuration instructions.

6. The data loading and storage system according to claim 5, further comprising a plurality of registers, wherein a register used for a base address is selected from the plurality of registers according to a parameter of a corresponding field of the configuration instructions in response to the indirect addressing of the plurality of address generating modules.

7. The data loading and storage system according to claim 6, wherein the address generating module is configured to support address conversion, address modulo and normal mode.

8. The data loading and storage system according to claim 7, wherein a number of the plurality of data loading modules and a number of the plurality of data storage modules are determined according to a specification of the multi-core processor array module.

9. The data loading and storage system according to claim 1, wherein the plurality of data storage modules are configured to store the computed data from the multi-core processor array module into the plurality of data buffering modules for next-level FFT computing.

10. A data loading and storage method, comprising:
storing configuration instructions and data;
buffering the configuration instructions and the data;
reading the configuration instructions in response to receiving a trigger signal, generating a data address according to the configuration instructions, and reading the data according to the data address;
receiving the read data, and computing the received data to obtain computed data;
receiving and storing the computed data; and
receiving and buffering the computed data, and storing the computed data again,
wherein the method further comprises: generating a fast Fourier transform (FFT) dedicated address.

11. The data loading and storage method according to claim 10, further comprising:
reading addresses of the configuration instructions.

12. The data loading and storage method according to claim 11, further comprising:

receiving the configuration instructions, and analyzing and storing parameters of the configuration instructions.

13. The data loading and storage method according to claim 12, further comprising:
performing indirect addressing or direct addressing according to the configuration instructions.

14. The data loading and storage method according to claim 13, further comprising:
selecting a register for a base address according to a parameter of a corresponding field of the configuration instructions in response to the indirect addressing.

15. The data loading and storage method according to claim 14, further comprising:
supporting address conversion, address modulo and normal mode.

16. The data loading and storage method according to claim 11, further comprising:
loading the data and a twiddle factor; and
generating the FFT dedicated address according to a number of points and a current level of FFT.

17. The data loading and storage method according to claim 16, further comprising:
storing the computed data for next-level FFT computing.

18. A data loading and storage system, comprising:
a storage module, configured to store configuration instructions and data;
a buffering module, comprising an instruction buffering module and a data buffering module, wherein the instruction buffering module is configured to buffer the configuration instructions in the storage module, and the data buffering module is configured to buffer the data in the storage module;
a control module, configured to send a trigger signal;
a plurality of data loading modules, configured to read the configuration instructions in the instruction buffering module in response to receiving the trigger signal, generate a data address according to the configuration instructions, and read the data in the data buffering module according to the data address;
a multi-core processor array module, configured to receive the data read by the plurality of data loading modules, and compute the received data to obtain computed data; and
a plurality of data storage modules, configured to receive and store the computed data from the multi-core processor array module;
wherein the data buffering module is further configured to receive and buffer the computed data from the multi-core processor array module, and write the computed data back to the storage module,
wherein a number of the plurality of data loading modules and a number of the plurality of data storage modules are determined according to a specification of the multi-core processor array module.

19. The data loading and storage system according to claim 18, wherein the plurality of data loading modules and the plurality of data storage modules are respectively provided with a plurality of corresponding fetching modules configured to generate addresses for reading the configuration instructions.

20. The data loading and storage system according to claim 19, wherein the plurality of data loading modules and the plurality of data storage modules are respectively provided with a plurality of corresponding decoding modules configured to receive the configuration instructions output by the fetching modules;
wherein the plurality of decoding modules are further configured to analyze and store parameters of the configuration instructions.

* * * * *